United States Patent Office 2,754,183
Patented July 10, 1956

2,754,183

GUANYLAMINO DIHYDROPYRIMIDINES

Joseph A. Chenicek, Bensenville, and Ralph B. Thompson, Hinsdale, Ill., assignors to Universal Oil Products Company, Des Plaines, Ill., a corporation of Delaware No Drawing. Application October 22, 1954,
Serial No. 464,161

20 Claims. (Cl. 44—63)

This application is a continuation-in-part of copending application Serial No. 238,009, filed July 21, 1951, now abandoned, and relates to certain hydrocarbon substituted guanylamino dihydropyrimidines, the manufacture and use thereof. More specifically the present invention relates to 2-(guanylamino)-4,5-dihydropyrimidines.

The novel compositions of the present invention are particularly useful as additives to organic compositions for inhibiting deterioration thereof, particularly deterioration caused by oxidation reactions and resulting in undesired color degradation, sediment formation, etc. The additive is particularly useful in stabilizing petroleum distillates including, for example, fuel oils, diesel oil, turbine oils, lube oils, jet fuel oils, etc.

In one embodiment the present invention relates to a novel composition of matter comprising a hydrocarbon substituted 2-(guanylamino)-4,5-dihydropyrimidine.

In another embodiment the present invention relates to a novel method of preparing a hydrocarbon substituted 2-(guanylamino)-4,5-dihydropyrimidine which comprises condensing an alpha, beta-unsaturated ketone with a biguanide.

In still another embodiment the present invention relates to an organic substance and particularly hydrocarbon oil containing, as an inhibitor against oxidative deterioration, a small amount of a hydrocarbon substituted 2-(guanylamino)-4,5-dihydropyrimidine.

In accordance with the present invention, an alpha, beta-unsaturated ketone is condensed with a biguanide. Any suitable alpha, beta-unsaturated ketone may be employed and preferably comprises a mono-olefinic ketone. Preferred alpha, beta-unsaturated ketones consist of carbon, hydrogen and oxygen. Representative alpha, beta-unsaturated ketones include vinyl methyl ketone, vinyl ethyl ketone, vinyl propyl ketone, vinyl butyl ketone, vinyl amyl ketone, vinyl hexyl ketone, vinyl heptyl ketone, vinyl octyl ketone, vinyl nonyl ketone, vinyl decyl ketone, vinyl undecyl ketone, vinyl dodecyl ketone, etc., vinyl phenyl ketone, vinyl tolyl ketone, vinyl xlyl ketone, vinyl ethylphenyl ketone, vinyl propylphenyl ketone, vinyl butylphenyl ketone, etc., mesityl oxide, benzalacetone, benzalacetophenone, dypnone, cyclohexanone-2, cyclohexylidenecyclohexanone, cyclohexylidenetetralone, etc. Of the carbonyl compounds condensable with biguanides, it is only the alpha, beta-unsaturated ketones which yield the desired dihydropyrimidine derivatives as condensation products.

The biguanides for use in accordance with the present invention must be unsubstituted except by hydrogen on the 4 and 5 nitrogen atoms and may be illustrated by the following general formula:

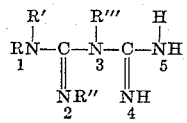

where R, R', R'' and R''' are selected from the group consisting of hydrogen, alkyl, alkenyl, aralkyl, aryl, alkaryl, cycloalkyl, and cycloalkenyl radicals. In some cases, these radicals may be substituted by and/or may contain other substituents including those containing oxygen, nitrogen, sulfur and/or halogen. Preferred biguanide compounds comprise those containing hydrocarbon substituents attached to the $N^1$ and/or $N^3$. Other substituted biguanides include those having hydrocarbon substituents attached to the $N^2$ or to any one or all of the $N^1$, $N^2$ and $N^3$ atoms.

As will be illustrated subsequently, it is essential that the biguanide contains two hydrogen atoms attached to the $N^5$ in order to condense with the carbonyl group of the ketone, with the simultaneous liberation of water. Illustrative biguanides for use in accordance with the present invention include $N^1$-methyl-biguanide, $N^1$-ethyl-biguanide, $N^1$-propyl-biguanide, $N^1$-butyl-biguanide, $N^1$-amyl-biguanide, $N^1$-hexyl-biguanide, $N^1$-heptyl-biguanide, $N^1$-octyl-biguanide, $N^1$-nonyl-biguanide, $N^1$-decycl-biguanide, $N^1$-undecyl-biguanide, $N^1$-dodecycl-biguanide, etc., $N^1$-phenyl-biguanide, $N^1$-tolyl-biguanide, $N^1$-xylyl-biguanide, $N^1$-ethylphenyl,-biguanide, $N^1$-propylphenyl-biguanide, $N^1$-butylphenyl-biguanide, etc., $N^1$-benzyl-biguanide, $N^1$-phenylethyl-biguanide, $N^1$-phenylpropyl-biguanide, $N^1$-phenylbutyl-biguanide, etc., $N^1,N^1$-dimethyl-biguanide, $N^1,N^1$-diethyl-biguanide, $N^1,N^1$-dipropyl-biguanide, $N^1,$-$N^1$-didbutyl-biguanide, $N^1,N^1$ - diamyl-biguanide, $N^1,N^1$-dihexyl-biguanide, etc., $N^1$-methyl-$N^1$-ethyl-biguanide, $N^1$-methyl - $N^1$-propyl-biguanide, $N^1$-methyl-$N^1$-butyl-biguanide, $N^1$-methyl-$N^1$-amyl-biguanide, $N^1$-methyl-$N^1$-hexyl-biguanide, etc., $N^1$-ethyl-$N^1$-propyl-biguanide, $N^1$-ethyl-$N^1$ - butyl - biguanide, $N^1$-ethyl-$N^1$-amyl - biguanide, $N^1$-ethyl-$N^1$-hexyl-biguanide, etc., $N^1$-propyl-$N^1$-butyl-biguanide, $N^1$-propyl-$N^1$-amyl - biguanide, $N^1$-propyl-$N^1$-hexyl-biguanide, etc., $N^1$-butyl-$N^1$-amyl-biguanide, $N^1$-butyl-$N^1$-hexyl-biguanide, etc., $N^1$-methyl-$N^1$-phenyl-biguanide, $N^1$-methyl - $N^1$-xylyl-biguanide, etc., $N^1$ - ethyl-$N^1$-phenyl-biguanide, $N^1$-ethyl-$N^1$-xylyl-biguanide, etc., $N^1$-propyl-$N^1$-phenyl-biguanide, $N^1$-propyl-$N^1$-xylyl-biguanide, etc., $N^1$-butyl-$N^1$-phenyl-biguanide, $N^1$ - butyl-$N^1$-xylyl-biguanide, etc., $N^1$-amyl-$N^1$-phenyl - biguanide, $N^1$-amyl - $N^1$ - xylyl-biguanide, etc., $N^1$-hexyl-$N^1$-phenyl-biguanide, $N^1$-hexyl-$N^1$-xylyl-biguanide, etc.

The specific biguanides hereinbefore set forth comprise those having substituents of the $N^1$. Biguanides having similar substitutions on the $N^2$ and/or $N^3$, either alone or in addition to the substitutions on $N^1$, may be employed. In the interest of simplicity and to thereby avoid a too lengthy specification, a rather complete list of specific compounds is not being repeated here, but only a few typical illustrative compounds are specifically set forth. However, it is understood that the broad scope of the present invention is not limited to these specific compounds and that any suitably substituted biguanide may be employed. The illustrative substituted biguanides include $N^2$-methyl-biguanide, $N^2$-ethyl-biguanide, $N^2$-propyl-biguanide, $N^2$-butyl-biguanide, etc., $N^2$-phenyl-biguanide, $N^2$-tolyl-biguanide, $N^2$-xylyl-biguanide, etc., $N^2$-benzyl-biguanide, $N^2$-phenylethyl-biguanide, etc., $N^3$-methyl-biguanide, $N^3$-ethyl-biguanide, $N^3$-propyl-biguanide, $N^3$-butyl-biguanide, etc., $N^3$-phenyl-biguanide, $N^3$-tolyl-biguanide, $N^3$-xylyl-biguanide, etc., $N^3$-benzyl-biguanide, $N^3$-phenylethyl-biguanide, etc., $N^1$, $N^2$ - dimethyl - biguanide, $N^1,N^2$ - diethyl - biguanide, $N^1$ $N^2$-dipropyl-biguanide, $N^1,N^2$-dibutyl-biguanide, etc., $N^1$-methyl-$N^2$-phenyl-biguanide, $N^1$-ethyl-$N^2$-phenyl-biguanide, etc., $N^1$-methyl-$N^2$-tolyl-biguanide, $N^1$-ethyl-$N^2$-tolyl-biguanide, etc., $N^1$-phenyl-$N^2$-methyl-biguanide, $N^1$-tolyl-$N^2$-methyl-biguanide, $N^1$-phenyl-$N^2$-ethyl-biguanide, $N^1$-tolyl-$N^2$-ethyl-biguanide, etc., $N^1,N^3$-dimethyl-biguanide, $N^1,N^3$-diethyl-biguanide, $N^1,N^3$-dipropyl-biguanide, $N^1,N^3$ - dibutyl - biguanide, etc., $N^1$-methyl - $N^3$ - phenyl-biguanide, $N^1$-ethyl-$N^3$-phenyl-biguanide, etc., $N^1$-methyl-$N^3$-tolyl-biguanide, $N^1$-ethyl-$N^3$-tolyl-biguanide, etc., $N^1$-phenyl-$N^3$-methyl-biguanide, $N^1$-tolyl-$N^3$-methyl-biguanide, etc., $N^1$-phenyl-$N^3$-ethyl-biguanide, $N^1$-tolyl-$N^3$-ethyl-biguanide, etc., $N^1,N^2,N^3$-trimethyl-biguanide, $N^1,N^2,N^3$-triethyl-biguanide, etc., $N^1,N^2,N^3$-triphenyl-biguanide, $N^1,N^2,N^3$-tritolyl-biguanide, etc., $N^1$-methyl-$N^2,N^3$-diphenyl-biguanide, $N^1$-ethyl-$N^2,N^3$-diphenyl-biguanide, etc., $N^1,N^3$-diphenyl-$N^2$-methyl-biguanide, $N^1,N^3$-diphenyl-$N^2$-ethyl-biguanide, etc.

The condensation of the alpha, beta-unsaturated ketone and biguanide reactants may be accomplished by heating a mixture of the reacting materials to a temperature of from about 50° to about 200° C., preferably with the simultaneous removal of water formed during the reaction as the condensation proceeds toward completion. In general, greater yields of the dihydropyrimidine product are obtained when approximately equimolar proportions of the biguanide and unsaturated ketone reactants are utilized in the condensation. The condensation reaction is preferably effected in the presence of a substance which removes the by-product water from the reaction mixture as condensation proceeds, such as a material which forms a water azeotrope at approximately the desired condensation temperature, usually at about 100° C. Such water-azeotrope forming substances are materials as benzene and other hydrocarbon compounds well known for this purpose.

A preferred guanylamino dihydropyrimidine compound comprises 2-(phenylguanylamino)-4,4,6-trimethyl-4,5-dihydropyrimidine and is prepared by the condensation of mesityl oxide with $N^1$-phenyl-biguanide, as illustrated in the following equation:

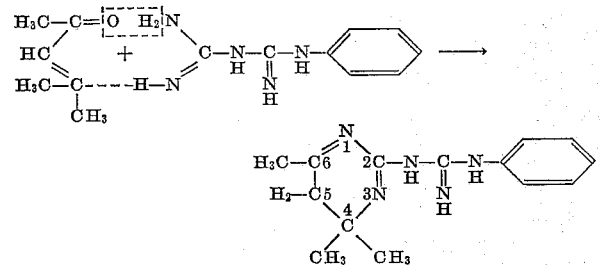

Referring to the equation, the dotted lines indicate the points of condensation. As hereinbefore set forth, it is essential that the $N^5$ contains two hydrogen atoms as these serve to condense with the oxide of the ketone to liberate water and to effect the condensation. The other point of condensation is at the beta carbon atom of the alpha, beta-unsaturated ketone, and this serves to complete the formation of the pyrimidine ring as illustrated above.

It is understood that the dihydropyrimidine may exist in a tautomeric form as, for example, a shift of the hydrogen atom between the 2 carbon atom and 3 carbon atom in the ring to a position between the 2 carbon atom of the ring and the amino nitrogen of the guanylamino group, with a corresponding shift of the hydrogen atom from the amino nitrogen to the 3 nitrogen of the ring. The tautomeric forms may be present in an equilibrium mixture.

The following condensations are submitted as typical illustrations. These are effected under substantially the same conditions as hereinbefore set forth. (1) Vinyl methyl ketone is condensed with biguanide to form 2-(guanylamino)-6-methyl-4,5-dihydropyrimidine. (2) Vinyl ethyl ketone is condensed with biguanide to form 2-(guanylamino)-6-ethyl-4,5-dihydropyrimidine. (3) Vinyl propyl ketone is condensed with biguanide to form 2-(guanylamino)-6-propyl-4,5-dihydropyrimidine. (4) Vinyl butyl ketone is condensed with biguanide to form 2-(guanylamino)-6-butyl-4,5-dihydropyrimidine. (5) Vinyl phenyl ketone is condensed with biguanide to form 2-(guanylamino)-6-phenyl-4,5-dihydropyrimidine. (6) Vinyl tolyl ketone is condensed with biguanide to form 2-(guanylamino)-6-tolyl-4,5-dihydropyrimidine. (7) Vinyl methyl ketone is condensed with $N^1$-methyl-biguanide to form 2-(methylguanylamino)-6-methyl-4,5-dihydropyrimidine. (8) Vinyl ethyl ketone is condensed with $N^1$-methyl-biguanide to form 2-(methylguanylamino)-6-ethyl-4,5-dihydropyrimidine. (9) Vinyl ethyl ketone is condensed with $N^1$-ethyl-biguanide to form 2-(ethylguanylamino)-6-ethyl-4,5-dihydropyrimidine. (10) Vinyl phenyl ketone is condensed with $N^1$-methyl-biguanide to form 2-(methylguanylamino)-6-phenyl-4,5-dihydropyrimidine. (11) Vinyl tolyl ketone is condensed with $N^1$-methyl-biguanide to form 2-(methylguanylamino)-6-tolyl-4,5-dihydropyrimidine. (12) Vinyl phenyl ketone is condensed with $N^1$-phenyl-biguanide to form 2-(phenylguanylamino)-6-phenyl-4,5-dihydropyrimidine. (13) benzalacetone is condensed with biguanide to form 2-(guanylamino)-4-phenyl-6-methyl-4,5-dihydropyrimidine. (14) Benzalacetone is condensed wtih $N^1$-phenyl-biguanide to form 2-(phenylguanylamino)-4-phenyl-6-methyl-4,5-dihydropyrimidine. (15) Benzalacetophenone is condensed with biguanide to form 2-(guanylamino)-4,6-diphenyl-4,5-dihydropyrimidine. (16) Dypnone is condensed with biguanide to form 2-(guanylamino)-4-methyl-4,6-diphenyl-4,5-dihydropyrimidine. (17) Dypnone is condensed with $N^1$-amyl-biguanide to form 2-(amylguanylamino)-4-methyl-4,6-diphenyl-4,5-dihydropyrimidine. (18) Vinyl methyl ketone is condensed with $N^3$-methyl-biguanide to form 2-(guanylmethylamino)-6-methyl-4,5-dihydropyrimidine. (19) Methyl ketone is condensed with $N^3$-phenyl-biguanide to form 2-(guanylphenylamino)-6-methyl-4,5-dihydropyrimidine. (20) Vinyl methyl ketone is condensed with $N^1,N^3$-dimethyl-biguanide to form 2-(methylguanyl-methylamino)-6-methyl-4,5-dihydropyrimidine. (21) Vinyl phenyl ketone is condensed with $N^1,N^3$-dimethyl-biguanide to form 2-(methylguanyl-methylamino)-6-phenyl-4,5-dihydropyrimidine. (22) Vinyl methyl ketone is condensed with $N^1,N^2$-dimethyl-biguanide to form 2-($N^1,N^2$-dimethylguanylamino)-6-methyl-4,5-dihydropyrimidine. (23) Vinyl methyl ketone is condensed with $N^1,N^2,N^3$-trimethyl-biguanide to form 2-($N^1,N^2$-dimethylguanyl-methylamino)-6-methyl-4,5-dihydropyrimidine. (24) Mesityl oxide is condensed with $N^1,N^2,N^3$-trimethyl-biguanide to form 2-($N^1,N^2$-dimethylguanyl-methylamino)-4,4,6-trimethyl-4,5-dihydropyrimidine, etc.

As hereinbefore set forth the hydrocarbon substituted guanylamino-4,5-dihydropyrimidines of the present invention are useful for stabilizing organic compounds and particularly hydrocarbon oils against oxidative deterioration. These compounds also may be effective for use in preserving other types of organic compositions such as fats of animals, marine or vegetable sources, alcohols, esters, etc. The hydrocarbon substituted guanylamino dihydropyrimidines are of substantially greater solubility in the hydrocarbon oils and, therefore, are particularly suitable for such use. When utilized for this purpose the dihydropyrimidines generally are employed in a concentration of from about 0.0001% to about 1% by weight and more particularly within the range of from about 0.001% to about 0.1% by weight of the composition to be stabilized.

The following examples are introduced to illustrate further the novelty and utility of the present invention but not with the intention of unduly limiting the same.

*Example I*

2-(phenylguanylamino)-4,4,6-trimethyl-4,5-dihydropyrimidine was prepared by the condensation of mesityl oxide with $N^1$-phenyl-biguanide at a temperature of 100° C. utilizing equimolar proportions of the ketone and biguanide reactants. The by-product water formed through the reaction was condensed from the reaction mixture and removed therefrom by condensing the vapors in a side-arm condenser. The yield of the desired dihydropyrimidine product was approximately quantitative, based upon the initial equimolar charge of the reactants.

*Example II*

A sample of fuel oil boiling in the gas-oil range was subjected to a series of accelerated color degradation and sludge-forming tests in the absence of and in the presence of dihydropyrimidine derivative prepared as indicated in Example I. In these tests various quantities of the dihydropyrimidines were utilized in the fuel oil. The accelerated test is an especially adapted, rapid procedure to produce results comparable to long term storage tests and comprises essentially heating the oil at 100° C. for a period of 20 hours and noting the percent transmittance of light through the sample compared with similarly treated blank. The dihydropyrimidine derivative was added to the fuel oil in amounts of from 0.006% to 0.1% by weight of the fuel oil. The percent transmittance of light through the inhibited oil and blank samples was based upon 100 for water as determined in a Lumitron, model 402–E, spectrophotometer. The blank sample of fuel oil containing none of the additive was very dark in color and had 0 transmittance of light and contained a precipitated sludge, whereas the sample of fuel oil containing 0.006% by weight of 2-(phenylguanylamino)-4,4,6-trimethyl-4,5-dihydropyrimidine permitted 68% transmittance of light through the sample and contained no precipitated sludge.

*Example III*

2-(p-tolylguanylamino)-4,4,6-trimethyl-4, 5 - dihydropyrimidine is prepared by the condensation of equimolar proportions of mesityl oxide with $N^1$-p-tolyl-biguanide at a temperature of about 100° C., while continuously removing the water formed in the reaction.

*Example IV*

2-(guanylamino)-6-methyl - 4, 5 - dihydropyrimidine is prepared by the condensation of vinyl methyl ketone with biguanide at a temperature of about 100° C. while continuously distilling the water formed in the reaction and withdrawing the same from the reaction mixture.

We claim as our invention:

1. A 2-(guanylamino)-4,5-dihydropyrimidine having at least one hydrocarbon substituent selected from the group consisting of alyl and aryl radicals.

2. A 2-(arylguanylamino)-4,5-dihydropyrimidine having at least one hydrocarbon substituent selected from the group consisting of alkyl and aryl radicals.

3. A 2-(phenylguanylamino) - 4,5 - dihydropyrimidine having at least one hydrocarbon substituent selected from the group consisting of alkyl and aryl radicals.

4. A 2-(tolylguanylamino)-4,5-dihydropyrimidine having at least one hydrocarbon substituent selected from the group consisting of alkyl and aryl radicals.

5. A 2-alkylguanylamino)-4,5-dihydropyrimidine having at least one hydrocarbon substituent selected from the group consisting of alkyl and aryl radicals.

6. 2-(arylguanylamino)-4,4,6-trimethyl-4,5 - dihydropyrimidine.

7. 2-(phenylguanylamino)-4,4,6-trimethyl-4,5- dihydropyrimidine.

8. 2-(tolylguanylamino)-4,4,6-trimethyl-4,5- dihydropyrimidine.

9. 2-(alkylguanylamino)-4,4,6-trimethyl-4,5-dihydropyrimidine.

10. A process which comprises reacting an alpha, beta-unsaturated ketone with a biguanide at a condensation temperature of from about 50° to about 200° C.

11. A process which comprises reacting an alpha, beta-unsaturated ketone consisting of carbon, hydrogen and oxygen with a $N^1$ hydrocarbon substituted biguanide at a condensation temperature of from about 50° to about 200° C.

12. A process which comprises reacting mesityl oxide with $N^1$-aryl-biguanide at a condensation temperature of from about 50° to about 200° C.

13. A process which comprises reacting mesityl oxide with $N^1$-phenyl-biguanide at a condensation temperature of from about 50° to about 200° C.

14. A process which comprises reacting mesityl oxide with $N^1$-tolyl-biguanide at a condensation temperature of from about 50° to about 200° C.

15. A process which comprises reacting an alpha, beta-unsaturated ketone consisting of carbon, hydrogen and oxygen with an $N^1$-alkyl-biguanide at a condensation temperature of from about 50° to about 200° C.

16. A hydrocarbon oil normally subject to oxidative deterioration containing, as an inhibitor therefor, a small amount of a guanylamino-4,5-dihydropyrimidine having at least one hydrocarbon substituent selected from the group consisting of alkyl and aryl radicals.

17. A hydrocarbon oil normally subject to oxidative deterioration containing, as an inhibitor therefor, a small amount of a 2(arylguanylamino)-4,5-dihydropyrimidine.

18. A hydrocarbon oil normally subject to oxidative deterioration containing, as an inhibitor therefor, a small amount of 2-(phenylguanylamino)-4,4,6-trimethyl-4,5-dihydropyrimidine.

19. A hydrocarbon oil normally subject to oxidative deterioration containing, as an inhibitor therefor, a small amount of 2-(tolylguanylamino)-4,4,6-trimethyl-4,5-dihydropyrimidine.

20. A hydrocarbon oil normally subject to oxidative deterioration containing, as an inhibitor therefor, a small amount of a 2-(alkylguanylamino)-4,5-dihydropyrimidine.

References Cited in the file of this patent

UNITED STATES PATENTS

| | | |
|---|---|---|
| 1,805,953 | Morton | May 19, 1931 |
| 2,372,588 | Larsen | May 27, 1945 |
| 2,373,021 | Downing | Apr. 3, 1945 |